United States Patent [19]

Lager et al.

[11] 4,276,645

[45] Jun. 30, 1981

[54] RECEIVER FOR SIMULTANEOUSLY TRANSMITTED CLOCK AND AUXILIARY SIGNALS

[75] Inventors: Jean-Paul Lager, Bougival; Daniel A. Vautherin, Paris, both of France

[73] Assignee: Le Material Telephonique, Boulogne-Billancourt, France

[21] Appl. No.: 42,565

[22] Filed: May 25, 1979

[30] Foreign Application Priority Data

May 31, 1978 [FR] France ..................... 78 16210

[51] Int. Cl.³ .................................. G06F 11/18
[52] U.S. Cl. .................... 371/36; 340/508; 371/68
[58] Field of Search ............ 371/8, 36, 68; 340/506, 340/508; 375/102

[56] References Cited

U.S. PATENT DOCUMENTS

| | | | |
|---|---|---|---|
| 3,226,569 | 12/1965 | James | 371/36 |
| 3,356,837 | 12/1967 | Raymond | 371/36 |
| 3,526,837 | 9/1970 | Zegers et al. | 371/36 |
| 3,665,173 | 5/1972 | Bouricius et al. | 371/36 |
| 3,848,116 | 11/1974 | Moder et al. | 371/36 |
| 3,859,513 | 1/1975 | Chuang et al. | 371/36 |
| 4,015,246 | 3/1977 | Hopkins, Jr. et al. | 371/36 |
| 4,081,790 | 3/1978 | Yamamoto et al. | 371/68 |

*Primary Examiner*—Charles E. Atkinson
*Attorney, Agent, or Firm*—Roland Plottel

[57] ABSTRACT

A receiver for simultaneously transmitted clock signals of frequency F (HC) and auxiliary signals of frequency f (HS), $F=kf$, $k=2, 3, 4, \ldots$, said clock and auxiliary signals being transmitted as a modified clock signal (HM) wherein one clock pulse is omitted every k clock pulses. The modified clock signal is simultaneously transmitted over three, nominally identical, transmission circuits (e.g. as HM1, HM2, & HM3). The receiver comprises the combination of a selection circuit (1) for generating a normal modified clock signal (H), even if one of the three received modified clock signals should be absent, and a signal separation circuit (2) for reconstituting both the clock signals (HC) and the auxiliary signals (HS). The receiver further includes an alarm circuit which promptly detects transmission failures or impairments, even though the main portion of the circuit continues to operate properly.

5 Claims, 12 Drawing Figures

RECEIVER FOR SIMULTANEOUSLY TRANSMITTED CLOCK AND AUXILIARY SIGNALS

FIELD OF THE INVENTION

Broadly speaking, this invention relates to a receiver for clock and auxiliary signals which are transmitted simultaneously. More particularly, this invention relates to the case where the auxiliary signals comprise signals which are derived from the clock signals and whose frequency f is a submultiple of the clock signal frequency F.

BACKGROUND OF THE INVENTION

There are important applications for the type of receiver above-described, especially in the distribution of clock signals for large electronic systems such as computers, telephone exchanges, etc.

When transmitting digital data, it is necessary to synchronize the various systems and circuits involved, and for this purpose clock signals are transmitted for synchronization and auxiliary signals are transmitted for "frame" alignment, the data transmitted being assembled in blocks of data known as frames.

Several methods have been proposed for reducing the number of transmission lines required, e.g. by simultaneously transmitting both types of signal over the same line. The method of transmitting signals used in the present invention comprises including the auxiliary signals in the clock signals by periodically omitting a clock signal pulse. When $F = kf$, one pulse is omitted every k clock signal pulses in order to obtain the modified clock signals.

The waveforms are illustrated in FIG. 1 for the case $k = 4$. The first waveform HC represents the clock signal, the second waveform HS represents the auxiliary signal, whilst the third waveform HM represents the modified clock signal.

In addition, for obvious reasons of dependability, the transmission circuit elements are conventionally tripled, transmitting the modified clock signals HM1, HM2 and HM3 over three transmission lines which are identical in every aspect. Such transmission devices require extremely high operational dependability, such that the failure of a single system component does not disable the system.

At the present time, it is necessary to increase the number of alarm devices when such a scheme is used, which raises problems of equipment size and cost.

SUMMARY OF THE INVENTION

The present invention therefore proposes a receiver for clock signals modified in accordance with the method described above, the receiver, after selection of the received signals, reconstituting the clock signals on the one hand and the auxiliary signals on the other, and ensuring extremely high dependability, i.e. detecting any failure, whilst allowing for the inevitable dispersion in signal propagation and avoiding the disadvantages of present multiple-alarm systems.

According to one aspect of the invention, the receiver includes a single alarm device connected to the transmission lines on the receiver input, said alarm device including means for detecting non-conformities in the transmitted signals, such as the presence of a constant signal or the inversion of a signal, and producing digital alarm signals and preferably digital signals comprising two encoded alarms.

According to another aspect of the invention, the selection circuit of the receiver includes a majority logic circuit followed by a J-K flip-flop and a delay line connected in a manner which eliminates any spurious pulses.

Other characteristics of the present invention will appear from a reading of the following description when taken with the appended drawings in which:

DETAILED DESCRIPTION OF THE INVENTION

Figure 1:
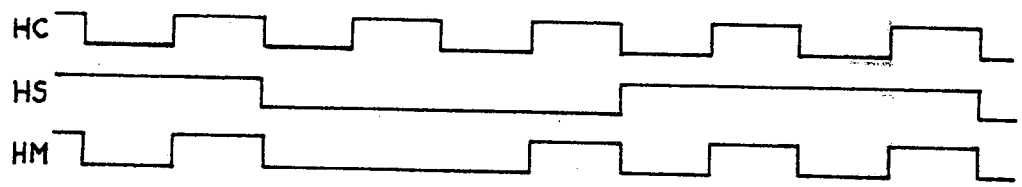
FIG. 1 illustrates the waveforms of the signals transmitted.
Figure 2:
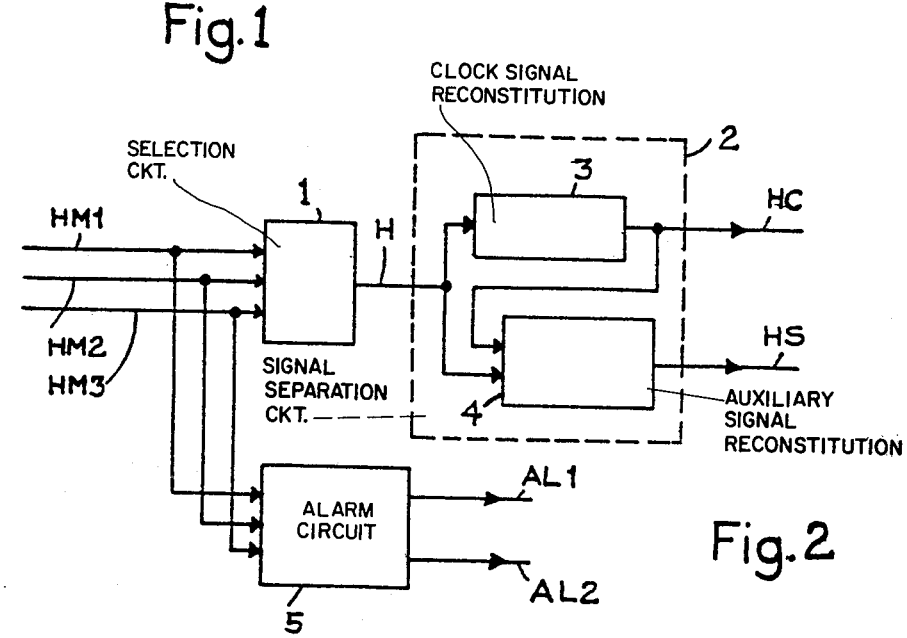
FIG. 2 is a block diagram of an illustrative receiver according to the present invention.

FIG. 2 is a simplified block schematic diagram of the receiver. It comprises a selection circuit 1 which receives, via three transmission lines, signals HM1, HM2 and HM3 of the type illustrated by waveform HM in FIG. 1.

Although these signals are identical at the transmitting end and although all the transmission lines ideally have the same length, the signals may show small differences or phase changes with respect to each other at the receiving end due to the inevitable dispersion in signal propogation.

The purpose of selection circuit 1 is to feed a normal signal H to a signal separation circuit 2, even if one of the signals HM1, HM2 and HM3 is abnormal.

The signal separation circuit 2 includes a circuit 3 for reconstituting the clock signal HC, and a circuit 4 for reconstituting the auxiliary signal HS.

In addition, the receiver includes an alarm device 5 which produces two encoded alarm signals AL1, and AL2, derived from signals HM1, HM2 and HM3.

Figure 3:
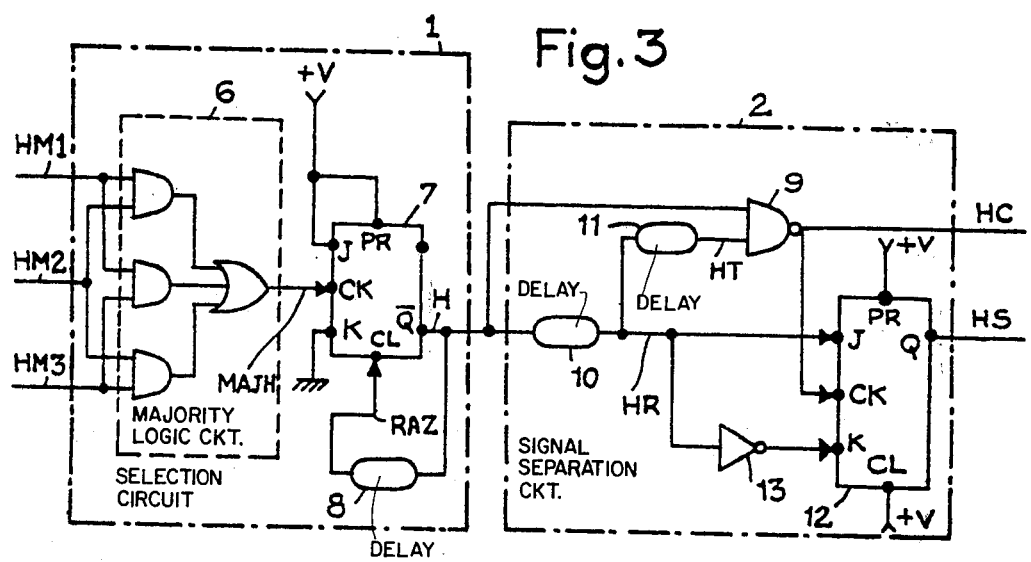
FIG. 3 is a block diagram which represents the selection circuit and the signal separation circuit, the whole representing the receiving circuit.

FIG. 3 shows circuits 1 and 2 in greater detail. As shown, the selection circuit 1 comprises a majority logic circuit 6 fed with signals HM1, HM2 and HM3, and which produces signal MAJH defined by the following logic equation:

$$MAJH = HM1 \cdot HM2 + HM1 \cdot HM3 + HM2 \cdot HM3$$

This logic circuit 6 is followed by a J-K flip-flop 7 whose clocking input CK is fed with signal MAJH. Inputs J and PR of flip-flop 7 are connected to the supply voltage $+V$, input K is grounded and the reset input CL is fed with the signal obtained on output $\overline{Q}$, via a delay line 8 which delays this signal H by an interval T1 depending on the frequency of the clock signal and the tolerable dispersion between the active edges of signals HM.

Figure 4A:
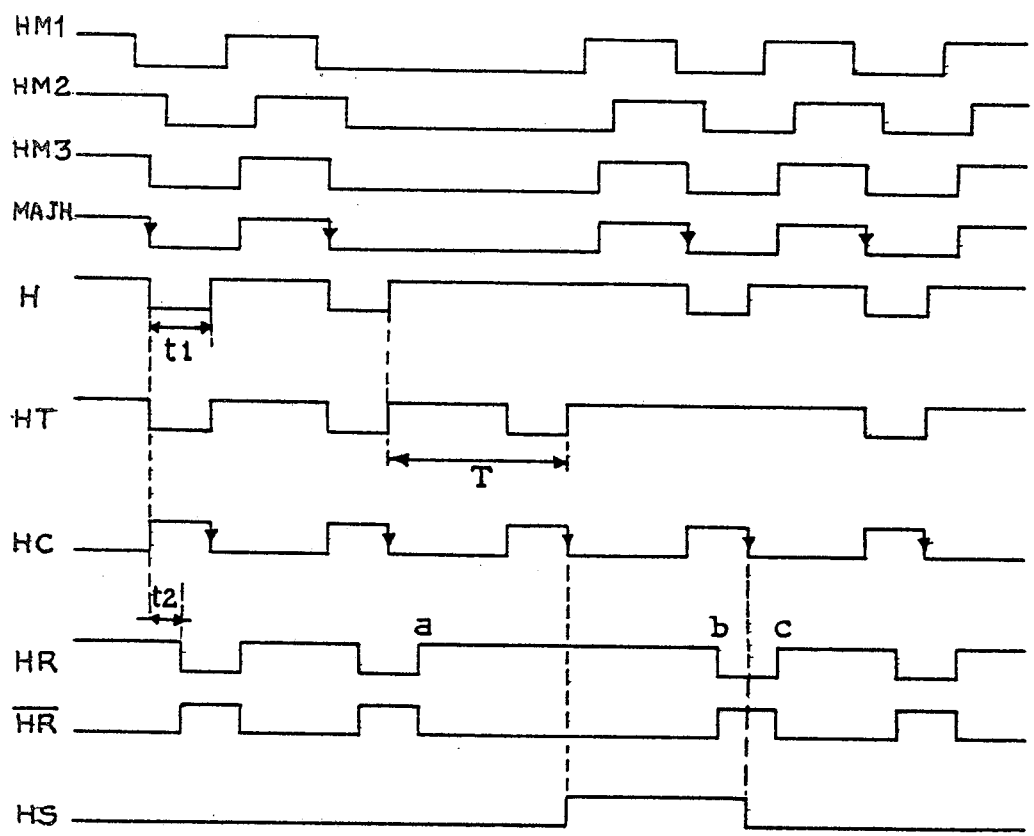
FIG. 4a is a timing diagram of the signals found during normal operation of the circuits shown in FIG. 3.
Figure 4B:
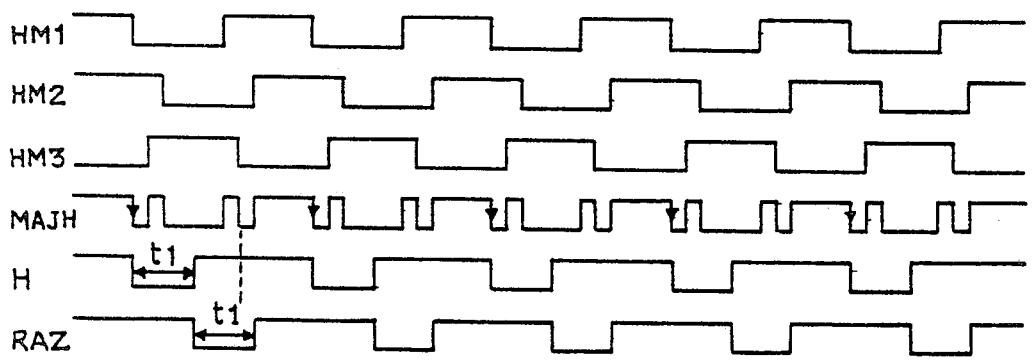
FIG. 4b is a timing diagram of the signals found in the selection circuit if one of the signals transmitted is inverted.

The operation of selection circuit 1 is explained in FIGS. 4a and 4b. FIG. 4a indicates the waveforms of signals HM1, HM2, HM3 and MAJH during normal operation. Since flip-flop 7 is connected as described above, signal H obtained an output $\overline{Q}$ changes to a logical "0" for an interval t1 on each falling edge of clock signal MAJH, and then changes to "1" on the next active edge of the clock.

In the case of failure, FIG. 4b illustrates the example of an inversion of signal HM3. On the first active falling edge of MAJH (indicated by an arrow in the figure), signal H changes to "0" for the interval t1, and then changes back to "1." For a period t1 following this instant, the falling edges of signal MAJH can no longer have any effect, since signal RAZ which is signal H shifted by t1, is "0." On the other hand, signal RAZ is "1" on the next active edge of MAJH, and signal H changes to "0."

The J-K flip-flop 7 and delay line 8 thus filter out any spurious edges due to specific faults. One clock pulse out of three can thus be inverted, present no edge, or possess a dispersion which is less than half of t1 without disturbing general operation.

Next, in order to reconstitute the clock signal HC, signal separation circuit 2 includes a NAND-gate 9 fed with signal H and also with signal HT, which is signal H delayed by a period T of the clock signal. In FIG. 3, this delay of one period is obtained by means of two delay lines 10 and 11, since the sum of the delays t2 and 53 obtained by means of these lines is equal to one clock period.

The principle of this reconstitution is clearly seen in FIG. 4a, in which signals H, HT and HC are shown, since HC=$\overline{H \cdot HT}$. The rising edges of HC are selected as the reference edges of the clock signals during operation, since these possess the least dispersion.

Finally, auxiliary signal reconstitution circuit 4 includes a J-K flip-flop 12, whose inputs PR and CL are connected to the supply voltage +V.

Input J is fed with signal HR, i.e. signal H produced by flip-flop 7 and delayed by delay line 10 by an interval t2 equal to half t1. Input K is fed with signal HR inverted by an inverter 13. Flip-flop 12 is clocked by signal HC and produces the auxiliary signal HS. The principle of auxiliary signal reconstitution is clearly seen in FIG. 4a, showing signals HC, HR, $\overline{HR}$ and HS. The interval t2 has been selected such that signal HR is registered (see the dashed line in FIG. 4a) in the middle of interval a, b, during which a pulse is missing, and in the middle of interval b, c.

Each time that a falling edge of clock HC occurs when signal HR is "1," a pulse having a duration equal to period T appears on the output.

As seen from the above description, the selection circuit and the signal separation circuit have been designed such that failure of one transmission line will not disturb overall operation.

To ensure system dependability, it is obvious that any failure should be detected and corrected before a second transmission line becomes defective. It is therefore important to check conformity between the three signals HM1, HM2 and HM3 at the input to the majority logic and this is the purpose of the alarm circuit 5.

Figure 5:
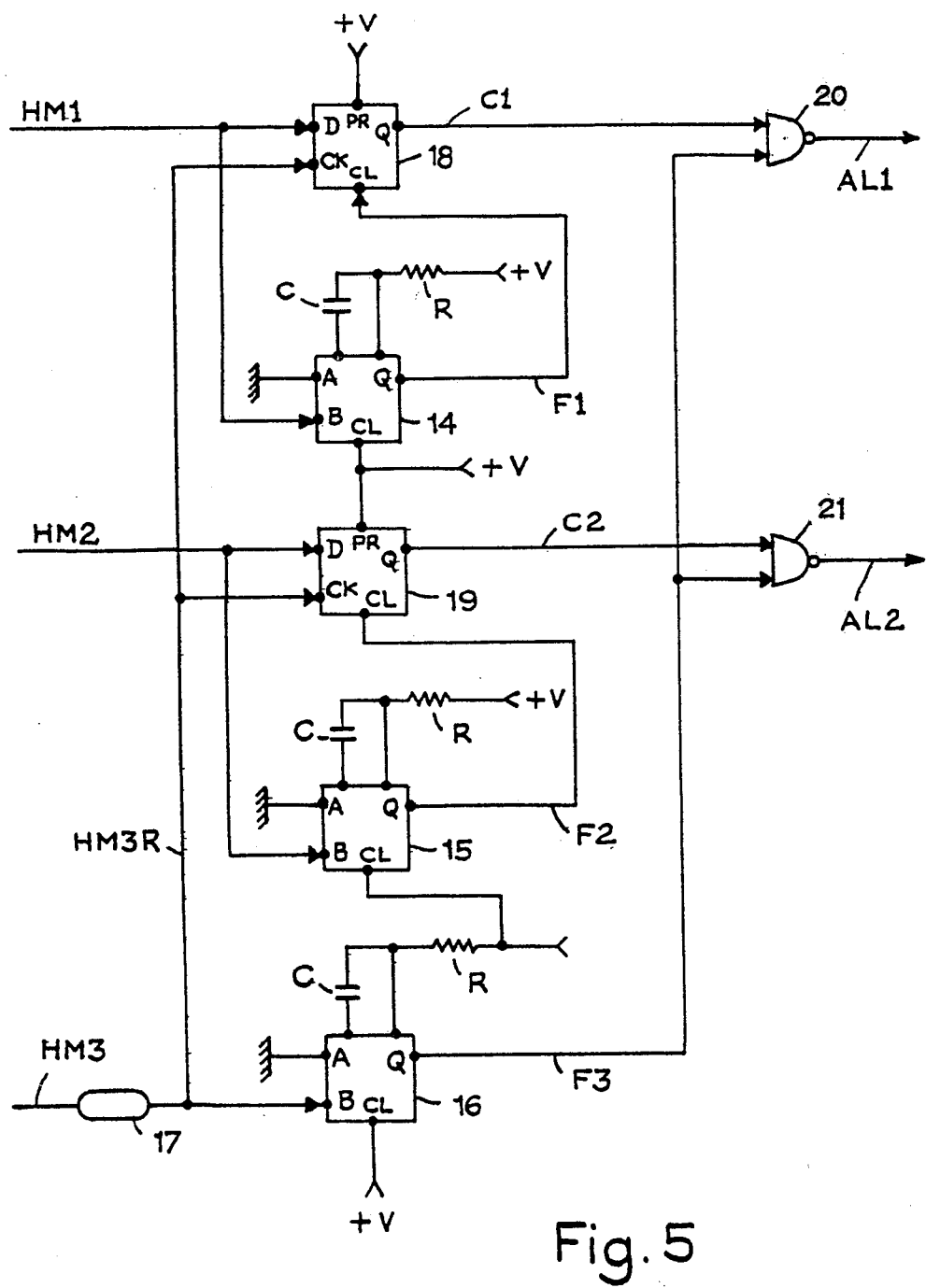
FIG. 5 is a block schematic circuit of the alarm device.

Alarm circuit 5 shown in FIG. 5 comprises three pulse edge detection circuits, each comprising a retrigerable monostable circuit on each of the transmission lines.

Inputs A of the three monostables 14, 15 and 16 are grounded, whilst inputs CL are connected to the supply voltage +V. Conventional R-C circuits are associated with these monostables.

Input B of monostable 14 is fed with signal HM1, input B of monostable 15 is fed with signal HM2 and input B of monostable 16 is fed with signal HM3R, which is signal HM3 delayed by a quarter clock period by means of delay line 17. The time constant of the R-C circuit associated with each monostable is selected such that the monostable output is a "1" so long as the modified clock signal edges are present on the input with the same frequency.

In addition, alarm circuit 5 includes two comparison circuits comprising two D type flip-flops 18 and 19. Flip-flop 18 compares a signal HM1 with a signal HM3R, considered as the reference, whilst flip-flop 19 compares signal HM2 with this same signal HM3R.

The signal selected as the reference is shifted in order to tolerate a certain degree of dispersion and signal inequality.

Inputs PR of flip-flops 18 and 19 are connected to the supply voltage +V, whilst their clock inputs are fed with the reference signal HM3R.

Input D of flip-flop 18 is fed with signal HM1, whilst input CL of this same flip-flop is fed with signal F1 obtained on output Q of monostable 14. Input D of flip-flop 19 is fed with signal HM2, whilst input CL of this flip-flop is fed with signal F2 obtained on output Q of monostable 15.

Finally, alarm circuit 5 possesses a logic circuit for generating alarm signals. This circuit comprises two NAND gates. The first gate 20 is fed with signal C1 obtained on output Q of flip-flop 18 and signal F3 obtained on output Q of monostable 16, and produces the first alarm signal AL1. The second gate 21 is fed with signal C2 obtained on output Q of the type D of flip-flop 19 and with signal F3 and produces the second alarm signal AL2.

The operation of the alarm circuit is illustrated in FIGS. 6a to 6f. Since the explanation is the same for HM1 and HM2, that of HM1 only is given. It should be recalled that only one transmission at a time is assumed to be defective.

Figure 6A:
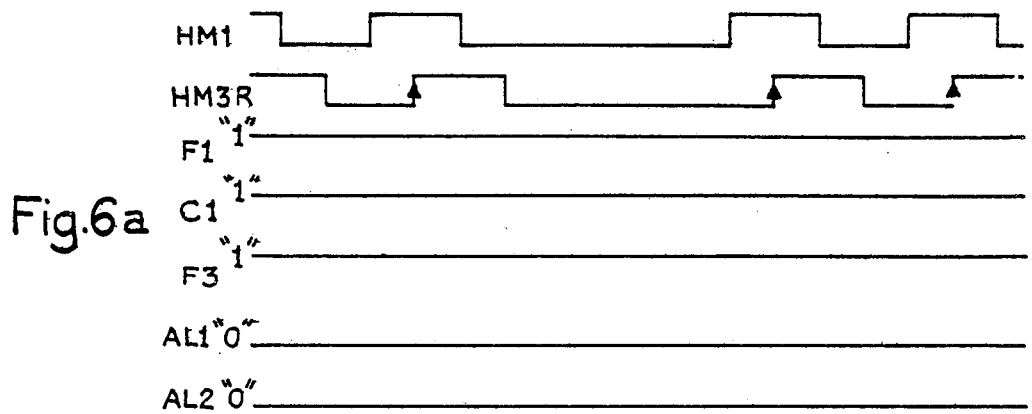
FIG. 6a is a timing diagram of the signals found in the circuit shown in FIG. 5.

Firstly, FIG. 6a shows the signal waveforms in the alarm device when all three transmitted signals are the same. The first signal shown is signal HM1 (see FIG. 1), whilst the second is the reference signal HM3R.

Figure 6B:
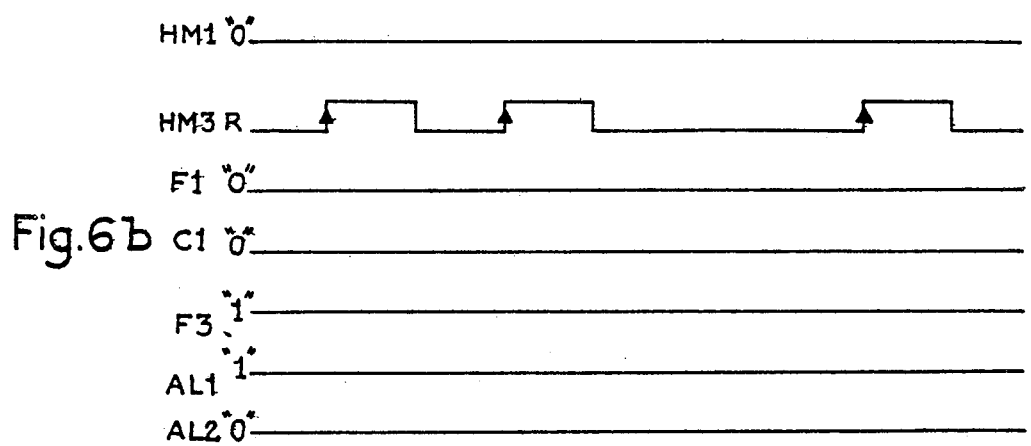
FIGS. 6b to 6f are timing diagrams for the signals found in the circuit shown in FIG. 5 for various cases of non-conformity in the signals transmitted.
Figure 6C:
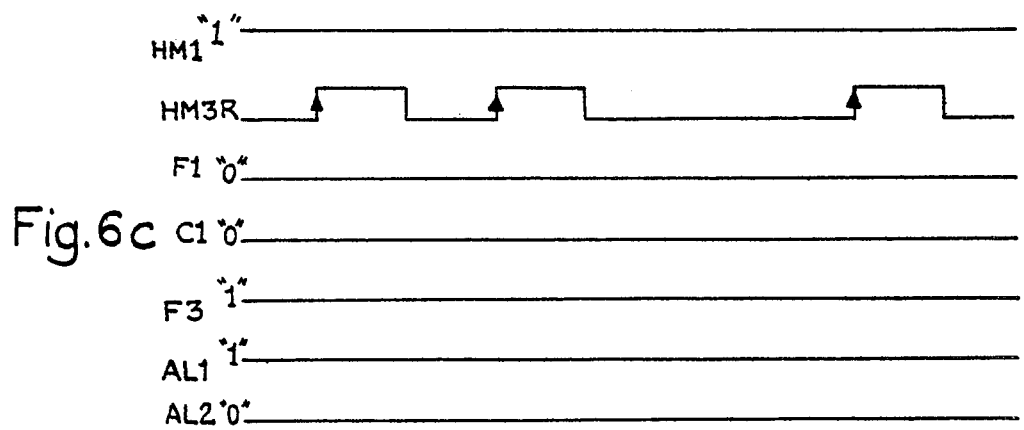

Since pulses of signal HM1 are present, signal F1 is at the upper logical level "1." Since signal F1 is "1," signal C1 assumes the value of signal HM1 on the input of flip-flop 18 on each rising edge of HM3R, i.e. the value "1." C1 is therefore always "1." In this case, HM3 is in conformity and F3 is therefore "1," resulting in both alarm signals AL1 and AL2 being at the lower logical level "0." In the case shown in FIG. 6b, signal HM1 is always, "0," resulting in signal F1 being "0." The reset input CL of flip-flop 18 is thus activated, causing signal C1 to be "0." Consequently, AL1 is "1," whilst AL2 is "0," since signals HM2 and HM3 are the same. In the case shown in FIG. 6c, signal HM1 is always "1," which results in signal F1 being "0," this having the same consequences as in the case illustrated in FIG. 6b.

Figure 6D:
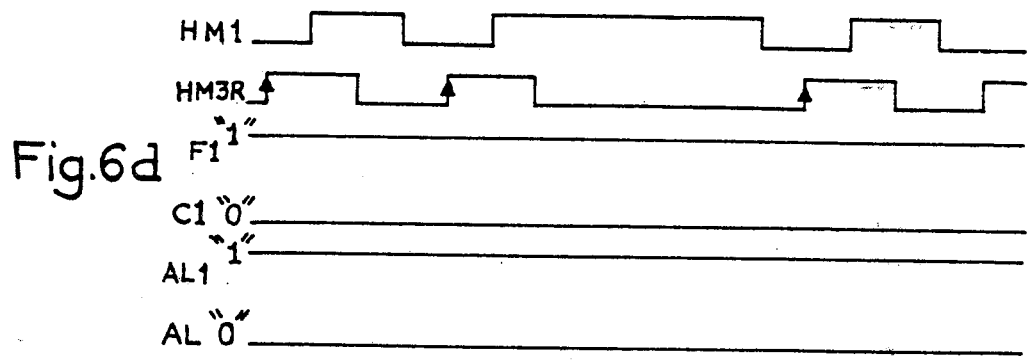
Figure 6E:
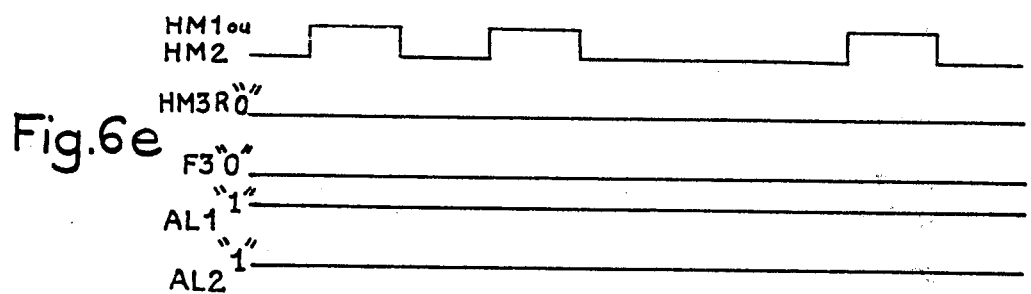

In the case illustrated in FIG. 6d, signal HM1 is inverted. Since signal HM1 presents pulses, signal F1 is "1" and signal C1 assumes the value of HM1 on each rising edge of HM3R, i.e. the value "0." C1 is therefore always "0." Consequently, AL1 is "1" and AL2 is "0." If the defective transmission is that corresponding to HM2, it is merely necessary to replace 1 by 2 and 2 by 1 in the above explanation, i.e. if HM2 is abnormal, AL1 is "0" and AL2 "1." In the case illustrated by FIG. 6e, signal HM3 is "0." Since HM3 presents no pulses, signal F3 is "0," with the result that both AL1 and AL2 are "1's." If HM3 is "1," exactly the same results are obtained.

Figure 6F:
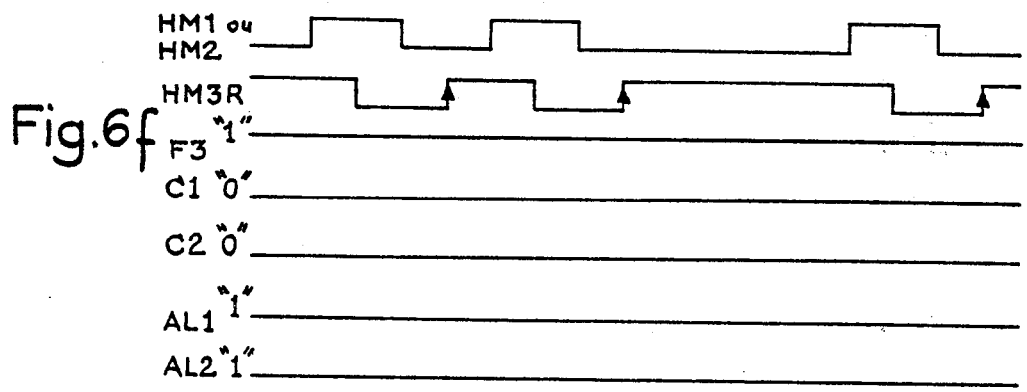

In the case illustrated in FIG. 6f, signal HM3 is inverted. C1 and C2 assume the values of HM1 and HM2 respectively on each rising edge of HM3R, i.e. C1 and C2 are "0's." On the other hand, since HM3 presents pulses, signal F3 is "1" and alarms AL1 and AL2 are both "1's." In conclusion, if a fault occurs on HM1 or HM2, the corresponding alarm is activated. If a fault occurs on HM3, both alarms are activated. This implies that any faults relating to three transmissions of signal HM are encoded on two bits.

Although the principles of the present invention are described above in relation with specific practical examples, it should be clearly understood that the said description is given as an example only and does not limit the scope of the present invention.

What is claimed is:

1. An improved receiver for clock signals (HC) of frequency F, and auxiliary signals (HS) of frequency f, f being a submultiple of F and related thereto by the relationship F=kf, where k is an integer, k=2, 3, 4, . . ., said signals being transmitted together by means of a modified clock signals (HM) in which one pulse is omitted every k clock signal pulses, said modified clock signals being transmitted simultaneously over three, nominally identical, transmission lines (e.g. as signals HM1, HM2, and HM3), said receiver being of a type that comprises:

(a) a selection circuit (1), including a majority logic circuit, connected to said three transmission lines for generating a normal, modified clock signal (H) even if one of the received, modified clock signals (HM1, HM2, or HM3) is abnormal; and
  (b) a signal separation circuit (2), connected to the output of said selection circuit, for reconstituting said clock signals (HC) and said auxiliary signals (HS),
  (c) an alarm circuit having three inputs, each connected to a corresponding one of said three transmission lines, at the input to said selection circuit, for generating an encoded digital alarm signal upon failure of any one of said three transmission lines, said alarm circuit including means for detecting signal non-conformities which comprises:
    (1) three detector circuits (14,15,16), each connected to a corresponding one of said three transmission lines, for detecting the absence of incoming signal pulses;
    (2) first (18) and second (19) comparison circuits, respectively connected to the first (HM1) and second (HM2) ones of said three transmission lines, for comparing the signals transmitted over said first and second transmission lines with the signal transmitted over said third transmission line (HM3), delayed by a quarter period in a delay line (17), said delayed signal acting as a reference signal for each of the two other transmitted signals; and
    (3) a logic circuit (20,21) having inputs connected to the outputs of said first and second comparison circuits (18,19) to the output of the detector circuit (16) associated with said delay circuit (17), for generating said encoded alarm signals.

2. The improved receiver according to claim 1, wherein each of said comparison circuits comprises a D-type flip-flop (18,19) whose D input is connected to the corresponding transmission line, whose clock input (CK) is connected to said third transmission line via said delay line, and whose reset input (CL) is connected to the output of a corresponding one of said detector circuits.

3. The improved receiver according to claim 1 or claim 2, wherein said alarm circuit produces at least two digital alarm signals thereby to indicate the status of all three transmission lines.

4. The improved receiver according to claim 3, wherein said logic circuit comprises: first and second NAND-gates (20,21), the first NAND-gate (20) being connected to the output of a first D-type flip-flop (18) and to the output of the detector circuit detecting the absence of pulses on said third transmission line and producing said first alarm signal (AL1), and the second NAND-gate (21) being connected to the output of the second D-type flip-flop (19) and to the output of said detector detecting the absence of pulses on said third transmission line and producing said second alarm signal (AL2).

5. The improved receiver according to claim 1, wherein said signal separation circuit comprises:

a clock signal reconstitution circuit (3) comprising a NAND-gate (9) having one input connected to the output of said selection circuit (1) and the other input connected to this same output, via a first delay line (11) delaying said signal by an interval equal to one period, the output of said NAND-gate comprising the reconstituted clock signal; and an auxiliary signal reconstitution circuit comprising a J-K flip-flop (12) whose J input is connected to the output of said selection circuit via a second delay line (10) and whose k input is connected to the J input via an inverter (13), the clock input of said J-K flip-flop being connected to the output of said NAND-gate (9) the output of which comprises the reconstituted auxiliary signal.

* * * * *